US009959479B2

(12) United States Patent
Lee et al.

(10) Patent No.: US 9,959,479 B2
(45) Date of Patent: May 1, 2018

(54) IMAGE CLASSIFICATION FOR ADJUSTMENT

(71) Applicant: Adobe Systems Incorporated, San Jose, CA (US)

(72) Inventors: Hyunjoon Lee, Jecheon (KR); Elya Shechtman, Seattle, WA (US); Jue Wang, Woodinville, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days. days.

(21) Appl. No.: 15/641,171

(22) Filed: Jul. 3, 2017

(65) Prior Publication Data
US 2017/0300771 A1 Oct. 19, 2017

Related U.S. Application Data

(63) Continuation of application No. 13/755,214, filed on Jan. 31, 2013.

(51) Int. Cl.
*G06K 9/62* (2006.01)
*G06K 9/32* (2006.01)
*G06K 9/00* (2006.01)

(52) U.S. Cl.
CPC ....... *G06K 9/3275* (2013.01); *G06K 9/00664* (2013.01)

(58) Field of Classification Search
None
See application file for complete search history.

(56) References Cited

U.S. PATENT DOCUMENTS

| 2002/0181802 | A1* | 12/2002 | Peterson | ............... G06T 3/005 382/284 |
| 2003/0016883 | A1 | 1/2003 | Baron | |
| 2011/0243466 | A1 | 10/2011 | Lee | |
| 2014/0212054 | A1 | 7/2014 | Lee | |

OTHER PUBLICATIONS

"Examiner's Answer to Appeal Brief", U.S. Appl. No. 13/755,214, dated Jul. 14, 2016, 9 pages.
"Final Office Action", U.S. Appl. No. 13/755,214, dated Jan. 23, 2015, 10 pages.
"Final Office Action", U.S. Appl. No. 13/755,214, dated Oct. 7, 2015, 14 pages.
"Non-Final Office Action", U.S. Appl. No. 13/755,214, dated Jun. 29, 2015, 12 pages.
"Non-Final Office Action", U.S. Appl. No. 13/755,214, dated Sep. 8, 2014, 9 pages.
"PTAB Decision", U.S. Appl. No. 13/755,214, dated May 2, 2017, 18 pages.

(Continued)

*Primary Examiner* — Mark Roz
(74) *Attorney, Agent, or Firm* — Wolfe-SBMC

(57) ABSTRACT

Image classification techniques are described for adjustment of an image. In one or more implementations, an image is classified by one or more computing device based on suitability of the image for adjustment to correct perspective distortion of the image. Responsive to a classification of the image as not suitable for the adjustment, suitability of the image is detected for processing by a different image adjustment technique by the one or more computing devices.

23 Claims, 8 Drawing Sheets

(56) References Cited

OTHER PUBLICATIONS

"Restriction Requirement", U.S. Appl. No. 13/755,214, dated Jun. 5, 2014, 7 pages.
Boureau,"Learning Mid-Level Features for Recognition", In CVPR, 2010., 2010, 8 pages.
Dalal,"Histograms of Oriented Gradients for Human Detection", In CVPR, 2005, 8 pages.
Huang,"Salient Coding for Image Classification", In CVPR 2011., 2011, pp. 1753-1760.
Korting,"C4.5 algorithm and Multivariate Decision Trees", Image Processing Division, National Institute for Space Research—INPE, SP, Brazil, 2006, 5 pages.
Lazebnik,"Beyond Bags of Features: Spatial Pyramid Matching for Recognizing Natural Scene Categories", CVPR, Jun. 2006, 8 pages.
Li,"Learning Generative Visual Models from Few Training Examples: An Incremental Bayesian Approach Tested on 101 Object Categories.", In CVPR Workshop on Generative-Model Based Vision, 2004., 2004, 9 pages.
Lowe,"Distinctive Image Features from Scale-Invariant Keypoints", International Journal of Computer Vision, Available at <http://www.cs.ubc.ca/~lowe/papers/ijc04.pdf>, Jan. 5, 2004, pp. 1-28.
Xiao,"SUN Database: Large-scale Scene Recognition from Abbey to Zoo", In CVPR, 2010, 2010, 8 pages.

\* cited by examiner

IMAGE CLASSIFICATION FOR ADJUSTMENT

RELATED APPLICATION

This application is a continuation of and claims priority to U.S. patent application Ser. No. 13/755,214 filed Jan. 31, 2013 entitled "Image Classification for Adjustment", the disclosure of which is incorporated by reference herein in its entirety.

BACKGROUND

Images may be captured using a variety of different image capture devices. These may include conventional image capture devices that capture the images using film as well as image capture devices that may capture the images digitally. Additionally, the range in which devices that incorporate image capture devices is ever increasing, which has expanded from a stand-alone cameras to incorporation of the camera in a mobile device, such as a mobile phone, tablet, or other computing devices.

Images captured by this variety of different devices, however, may contain perspective distortions. Perspective distortions cause a scene captured by the image to differ from a layout expected by human perception. Conventional techniques there are utilized to correct these perspective distortions, however, may be resource intensive, may fail at correcting the distortions, and may introduce additional distortions. Accordingly, users of these conventional techniques may be forced to manually attempt a variety of different techniques to attempt to correct the distortion, which may not even be possible in some situations.

SUMMARY

Image classification techniques are described for adjustment of an image. In one or more implementations, an image is classified by one or more computing devices based on suitability of the image for adjustment. Responsive to a classification of the image as not suitable for the adjustment, suitability of the image is detected for processing by a different image adjustment technique by one or more computing devices.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Image adjustment may be performed to correct a variety of different perspective distortions, such as skewing of an image scene in two dimensional and three dimensional space such that the appearance of the image "looks wrong" to a user, e.g., in-plane and out-of-plane rotation. However, conventional techniques that are employed to correct the perspective distortions may achieve unwanted results and further may be resource intensive such that a user is forced to wait for processing to view the unwanted results. Consequently, a user may become frustrated when using these conventional techniques.

Image classification techniques for image adjustment are described. In one or more implementations, the techniques may be employed to classify an image based on suitability for image adjustment. In the image is suitable as indicated by the classification, the image adjustment may then be performed. Additionally, this classification may be performed automatically and without user intervention. In this way, performance of operations involved in image adjustment may be skipped for images that are not suited for the adjustment.

Additionally, these techniques may continue for different image adjustment techniques. For example, a determination may be made that the image is not suitable for upright adjustment. Therefore, suitability of the image for processing by a different image adjustment technique may then be performed, such as for a horizon adjustment technique. In this way, a system may be implemented that may employ a variety of different adjustment techniques automatically and without user intervention based on suitability of the techniques for an image to be processed. A variety of different functionality may be employed in the implementation of these techniques, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
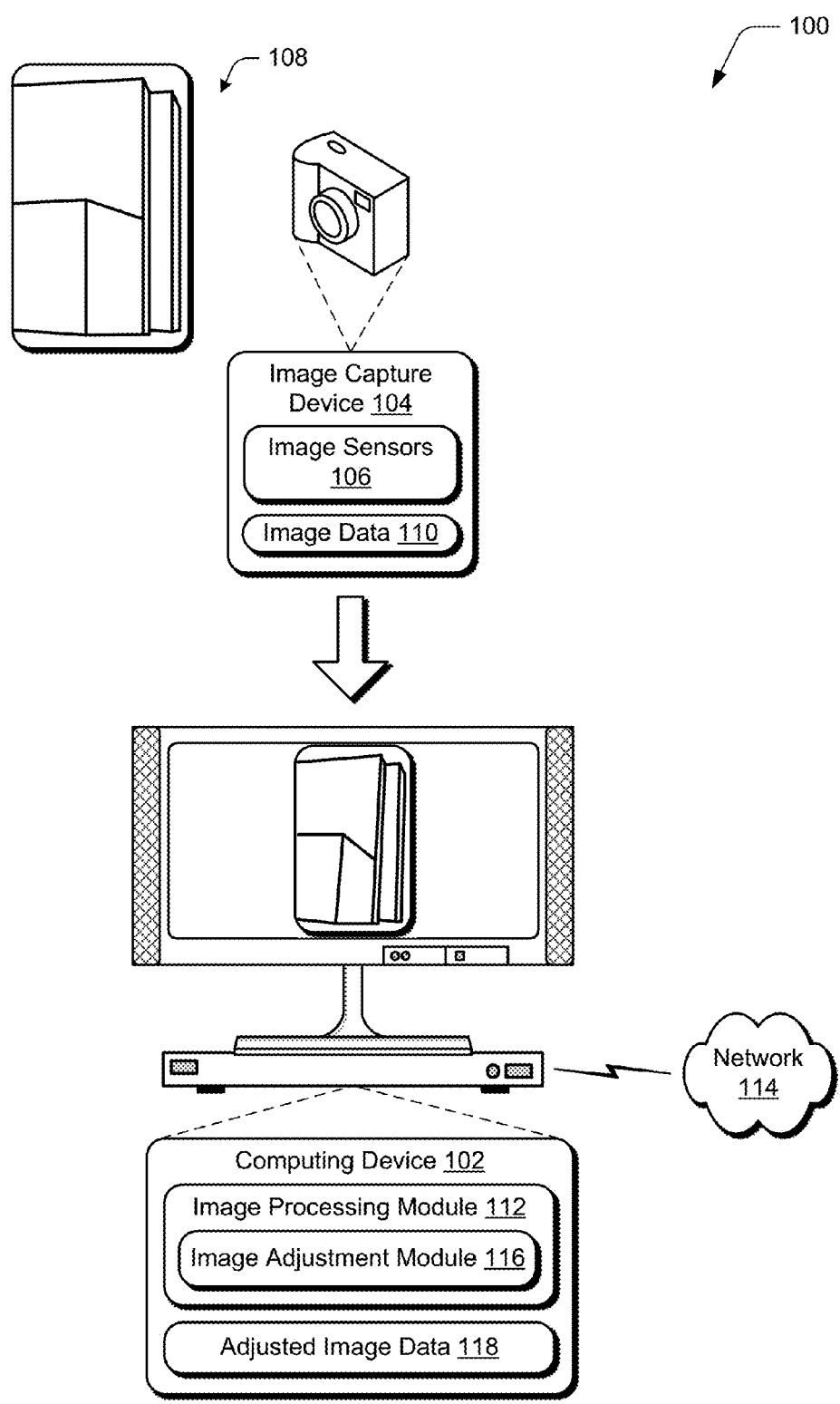
FIG. 1 is an illustration of an environment in an example implementation that is operable to employ techniques described herein relating to image classification for adjustment.

FIG. 1 is an illustration of an environment 100 in an example implementation that is operable to employ classification techniques described herein. The illustrated environment 100 includes a computing device 102 and an image capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 8.

The image capture device 104 may also be configured in a variety of ways. For example, the image capture device 104 may be configured as a stand-alone camera as illustrated, a video camera, scanner, copier, mobile device, and so forth. Although the image capture device 104 is illustrated separately from the computing device 102, the image capture device 104 may be configured as part of the computing device 102, e.g., for a tablet configuration, smart phone, and so forth.

The image capture device 104 is illustrated as including image sensors 106 that are configured to capture an image of an image scene 108, which is stored as image data 110. For example, the image sensors 106 may be configured to capture images using a Bayer pattern or other configurations. In another example, the image data 110 may be data captured of an image initially captured using film by the image capture device 104, e.g., a scan of an image developed on paper from film.

Regardless of how the image data 110 originated, the image data 110 may be obtained by an image processing module 112 for processing. Although illustrated as being implemented on the computing device 102, functionality represented by the image processing module 112 may also be implemented in whole or in part "over the cloud" via the network 114, such as by a server farm as part of a web service, in a distributed environment, and so on as further described in relation to FIG. 8.

An example of functionality image processing functionality that may be implemented by the image processing module 112 is illustrated as an image adjustment module 116. The image adjustment module 116 is representative of functionality to adjust the image data 110 for perspective distortions to generate adjusted image data 118. In this way, the image adjustment module 116 may adjust the image data 110 to be consistent with expectations of human perception, further discussion of which may be found below and shown in a corresponding figure.

Figure 2:
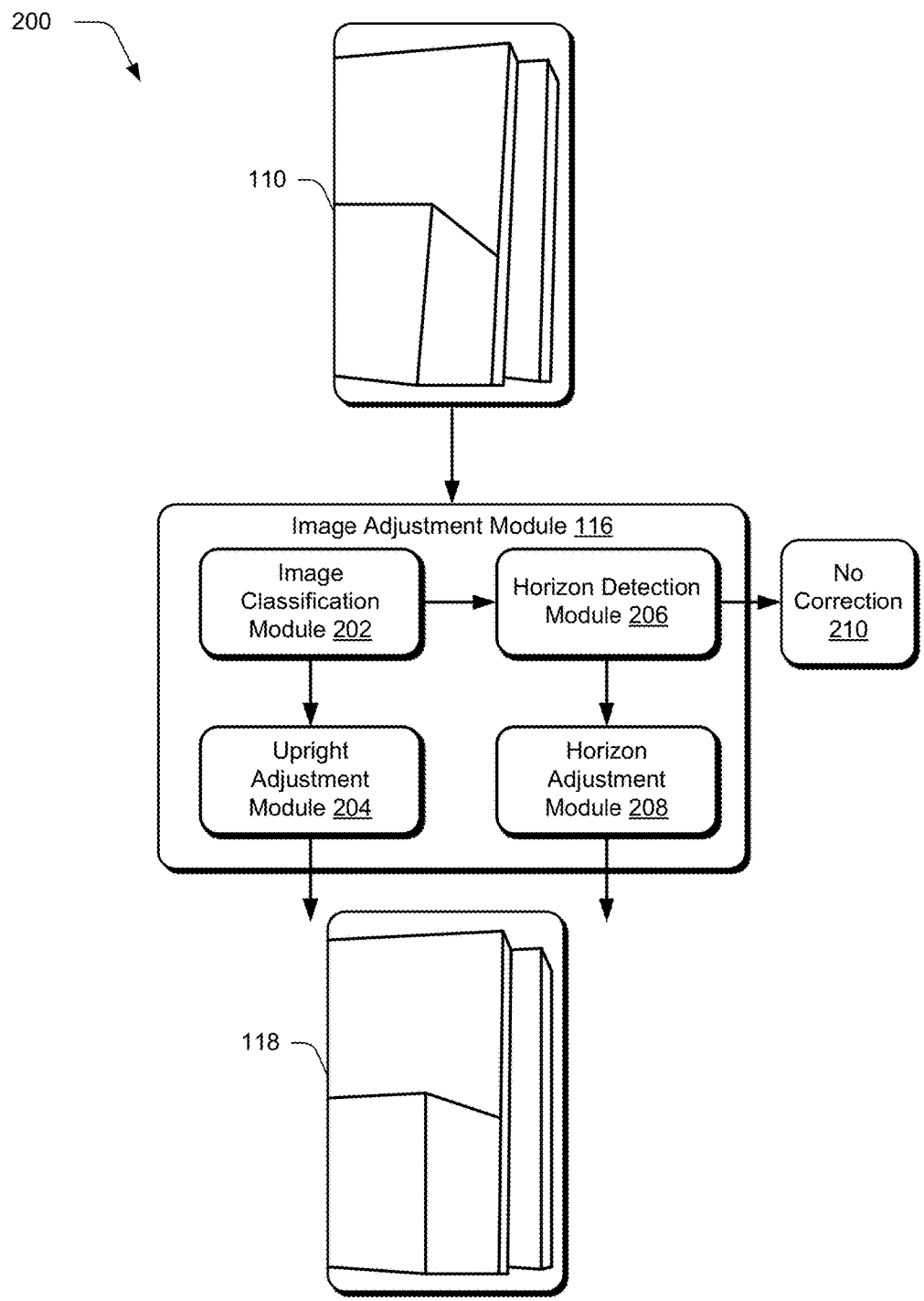
FIG. 2 depicts a system in an example implementation in which an image adjustment module of FIG. 1 and operation thereof is shown in greater detail.

FIG. 2 depicts a system 200 in an example implementation in which image adjustment module 116 and operation thereof is shown in greater detail. In this example, image data 110 is as captured from an image scene 108 in FIG. 1. As illustrated, however, the image data 110 includes a perspective distortion such that the image data 110 is skewed in two-dimensional and/or three-dimensional space. For example, the image data 110 as illustrated exhibits out-of-plate rotation. Accordingly, the image data 110 may be obtained by an image adjustment module 116 to correct this perspective distortion so that the image data 110 is consistent with expectations of human perception.

A variety of different techniques may be employed by the image adjustment module 116 to form adjusted image data 118. In the illustrated example, the image data 110 is first obtained by an image classification module 202. The image classification module 202 is representative of functionality to determine suitability of the image 110 for upright adjustment that may be performed to correct perspective distortion of the image by the upright adjustment module 204.

The image classification module 202, for instance, may employ criteria that are used by the upright adjustment module 204 to perform the upright adjustment. For example, the upright adjustment module 204 may identify characteristics of the image data 110 and from these characteristics compute a correction to be made to the image data 110 to correct the perceived skewing in the image. This may include identification of man-made structures, natural features that are typically relatively straight such as trees and horizons, and so on. The upright adjustment module 204 may then use the identification of these features to correct skewing of the image data 110 in two dimensional or three dimensional space.

Accordingly, the image classification module 202 may leverage knowledge of these characteristics to classify the image data 110 based on suitability of the image data 110 for the upright adjustment techniques performed by the upright adjustment module 204. Additionally, this classification may be performed by the image classification module 202 without actually performing the techniques to adjust the image data 110 by the upright adjustment module 204. Therefore, resources of the computing device 102 (e.g., processing and memory resources) as well as time by a user of the computing device 102 may be conserved.

For example, the image classification module 202 may classify the image data 110 as suitable for upright adjustment techniques performed by the upright adjustment module 204. Accordingly, these techniques may then be performed by the upright adjustment module 204 responsive to this classification to generate the adjusted image data 118.

In the illustrated example, the image data 110 is skewed as previously described such that the image of the buildings are slanted relative to edges of the image depicted by the image data 110. The upright adjustment techniques may then be performed by the upright adjustment module 204 to correct perspective of the image data 110 to form the adjusted image data 118 in which the buildings are oriented vertically and so on relative to the edges of the image.

Additionally, these techniques may be leveraged by a variety of other image adjustment techniques to locate a technique that has a likelihood of functioning as intended to correct perspective distortion. For example, the image classification module 202 may classify the image data 110 as not suited for use by the upright adjustment module 204 to correct perspective distortion. Accordingly, suitability of one or more other image adjustment techniques may be determined that are different than the upright adjustment techniques.

An example of such a technique is illustrated in the system 200 of FIG. 2 as involving a horizon. A horizon detection module 206, for instance, may be representative of functionality to detect whether a horizon is identifiable in the image data 110. If so, a horizon adjustment module 208 may be employed that performs one or more image adjustment techniques to correct perspective distortion based on the detected horizon in the image data 110 to form the adjustment imaged data 118. Thus, like the image classification module 202, the horizon detection module 206 may also classify the image data 110 based on suitability for a corresponding image adjustment technique. This classification may then serve as a basis to determine whether to perform the operations of the horizon adjustment module 208.

This process may continue to iterate through a variety of different image adjustment techniques to locate a technique that has a likelihood of success. In one or more implementations, if it is determined that none of the techniques are suitable for being performed on the image, no correction 210 is performed on the image data 110. Thus, in such a situation the image data 210 may "remain as is" without correction and thus failures encountered using conventional techniques may be avoided, such as to align to an image edge that is not the horizon and so on. An example of the classification techniques is described as follows and as shown in the corresponding figure.

Figure 3:
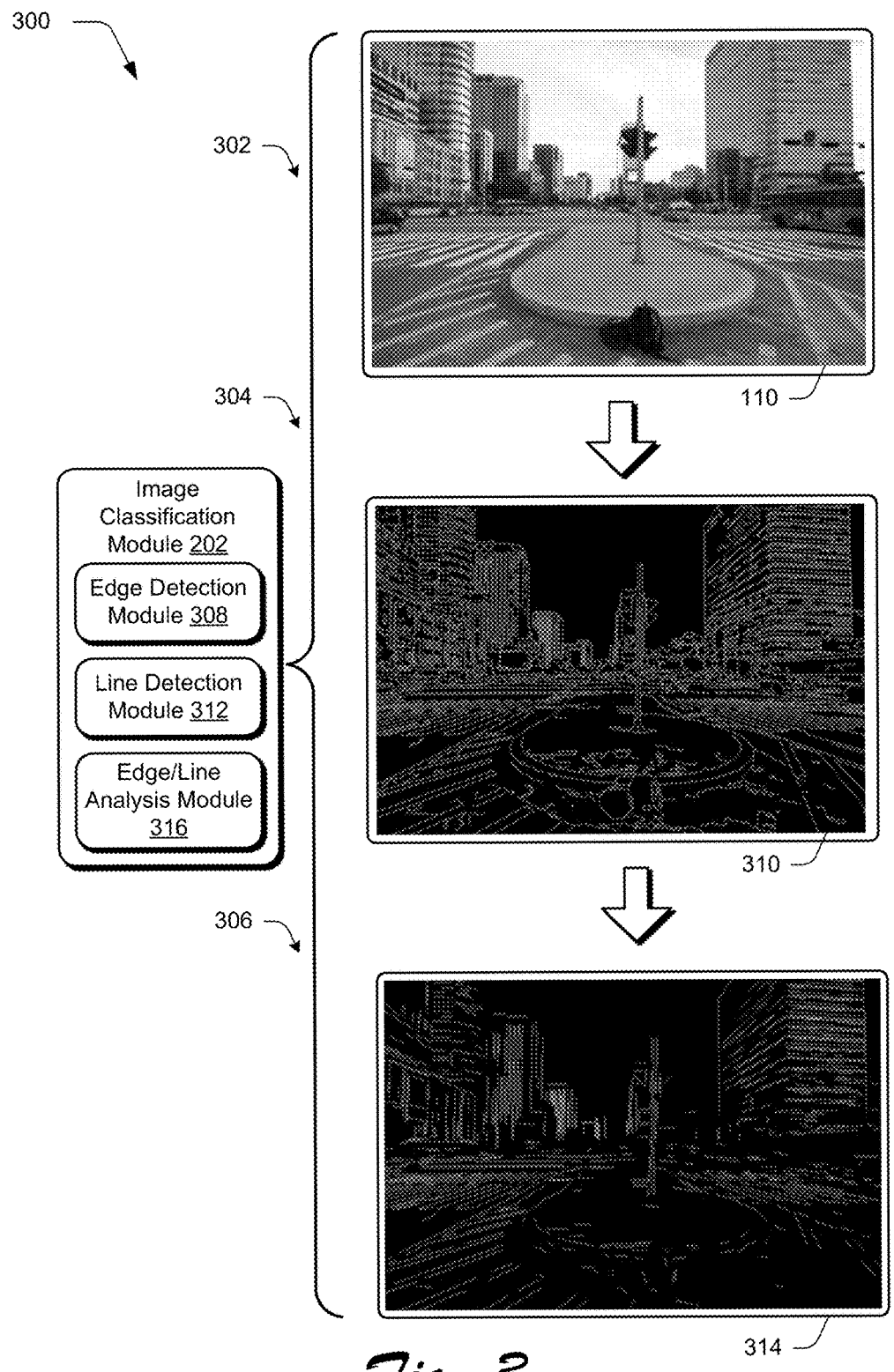
FIG. 3 depicts a system showing the image classification module of FIG. 2 in greater detail as employing criteria to determine suitability for an associated image adjustment technique.

FIG. 3 depicts a system 300 showing the image classification module 202 in greater detail as employing criteria to determine suitability for an associated image adjustment technique. This system is 300 shown using first, second, and third stages 302, 304, 306. At the first stage 302, image data 110 is shown that is captured using one or more image sensors 106 of an image capture device 104. The image data 110 is captured of an image scene that includes a street with building and a crossing light.

At the second stage 304, the image data 110 is processed by an edge detection module 308. The edge detection module 308 is representative of functionality to detect edges 310 in the image data 110. The edge detection module 308, for instance, may detect differences in textures, colors, and so on in the image data 110 that are indicative of edges, such as edges indicating a change from one object to another in the image data 110.

At the third stage 306, the image data 110 is processed by a line detection module 312. The line detection module 312 is representative of techniques to detect line segments 314 from the image data 110. This may be performed directly on the image data 110 or indirectly using the edges 310 detected by the edge detection module 308. For example, the line detection module 312 may be configured to determine which edges 310 detected by the edge detection module 308 are relatively or substantially straight.

The image classification module 202 may then employ this data as part of the classification of the image data 110. For example, the image classification module 202 may employ an edge/line analysis module 316. The edge/line analysis module 316 is representative of functionality to classify the image data 110 for suitability for adjustment by the upright adjustment module 204 of FIG. 2 based on a ratio between a number of edge pixels and line pixels in the image data 110 as computed by the edge detection module 308 and line detection modules 312, respectively. Thus, this analysis may be performed as part of the classification to analyze whether the image data 110 has sufficient indications of lines that may serve as a basis to adjust the image data 110.

Figure 4:
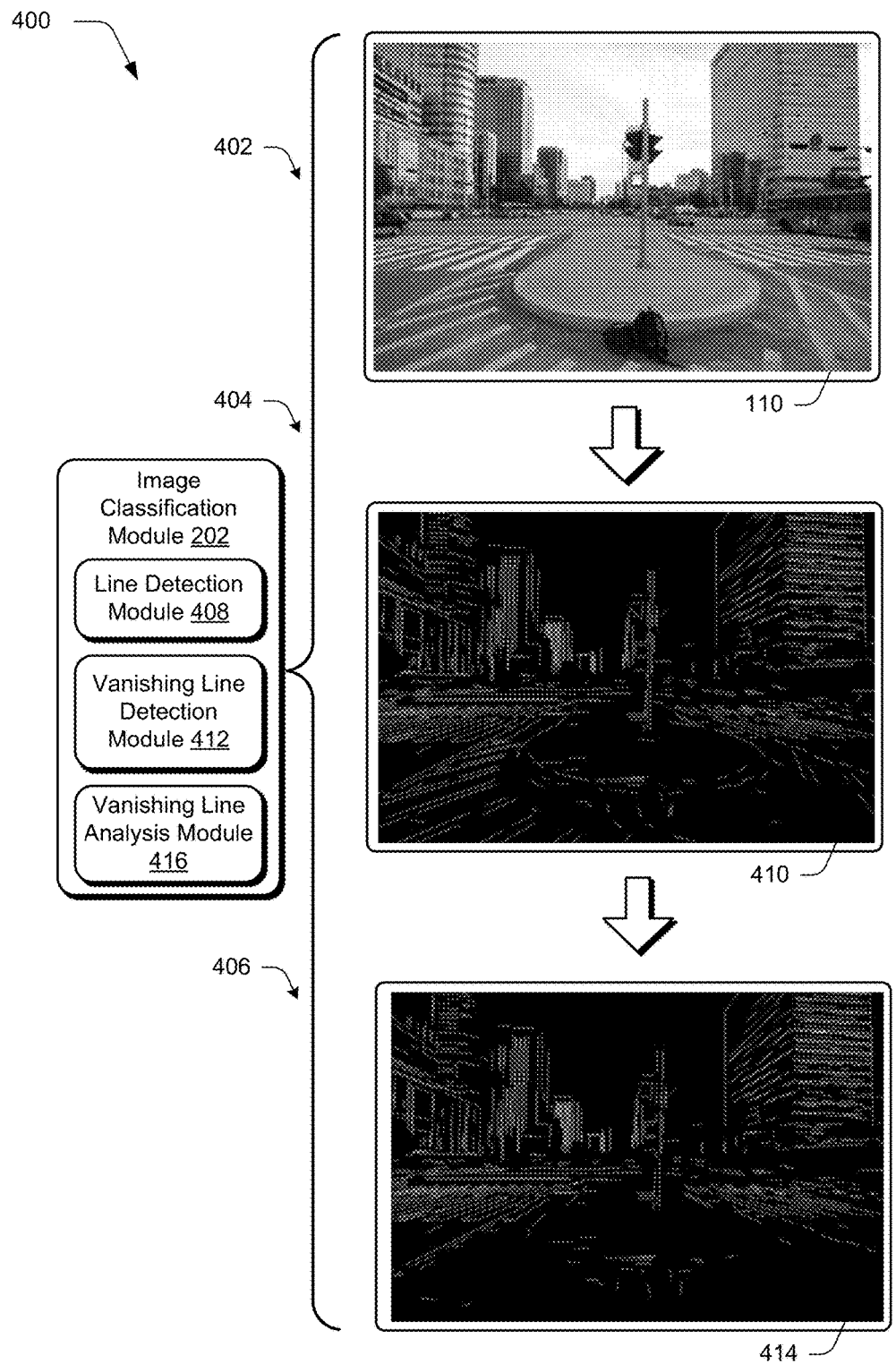
FIG. 4 depicts a system showing the image classification module of FIG. 2 in greater detail as employing additional criteria to determine suitability for an associated image adjustment technique.

FIG. 4 depicts a system 400 showing the image classification module 202 in greater detail as employing additional criteria to determine suitability for an associated image adjustment technique. This system is 400 is shown using first, second, and third stages 402, 404, 406. At the first stage 402, image data 110 is again shown that is captured using one or more image sensors 106 of an image capture device 104.

At the second stage 404, the image data 110 is processed by a line detection module 308 to detect line segments 410. As before, this may be performed in a variety of different ways, such as through use of the edge detection module 308 and line detection module 312 of FIG. 3. In this way, the image classification module 202 may determine a number of pixels of the image data 110 that is associated with lines.

At the third stage 406, a vanishing line detection module 412 of the image classification module 202 is utilized to detect which of the line segments 410 correspond to vanishing lines 414 in the image data 110. This may be computed in a variety of ways, such as through use of an energy function to obtain Manhattan directions "$M=[v_x\ v_y\ v_z]$" where "$v_x$," "$v_y$," and "$v_z$," that represent three vanishing points that correspond to x, y, and z direction, respectively.

The image classification module 202 may then employ this data as part of the classification of the image data 110. For example, the image classification module 202 may employ a vanishing line analysis module 416. The vanishing line analysis module 416 is representative of functionality to classify the image data 110 for suitability for adjustment by the upright adjustment module 204 of FIG. 2 based on a ratio between a number of line pixels and vanishing line pixels in the image data 110. Thus, this analysis may be performed as part of the classification to analyze whether the image data 110 has sufficient indications of directions as indicated by vanishing lines that may be used as a basis to align the image data 110.

The vanishing line analysis module 416 may also employ other techniques based on vanishing lines as part of the analysis to classify the image data 110. For example, the vanishing line analysis module 416 may be utilized to compute average line segment lengths of horizontal and vertical vanishing lines. For example, the vanishing line analysis module 416 may compute a length of "N" number of longest lines segments among horizontal and vertical line segments, respectively. This may also be used as a basis for classifying the image data 110 as suited or not suited for upright adjustment.

Thus, the image adjustment module 116 may base the classification of the image data 110 on a variety of different factors, such as the two ratios and the two line segment lengths described above. These factors may then be used to determine whether the image includes a relatively strong structure and thus is suitable for upright adjustment. Further, this determination may be performed automatically and without user intervention. If the image data 110 is not suitable for upright adjustment, suitability of the image data 110 for a different image adjustment technique may be determined, an example of which is described as follows and shown in the corresponding figure.

Figure 5:
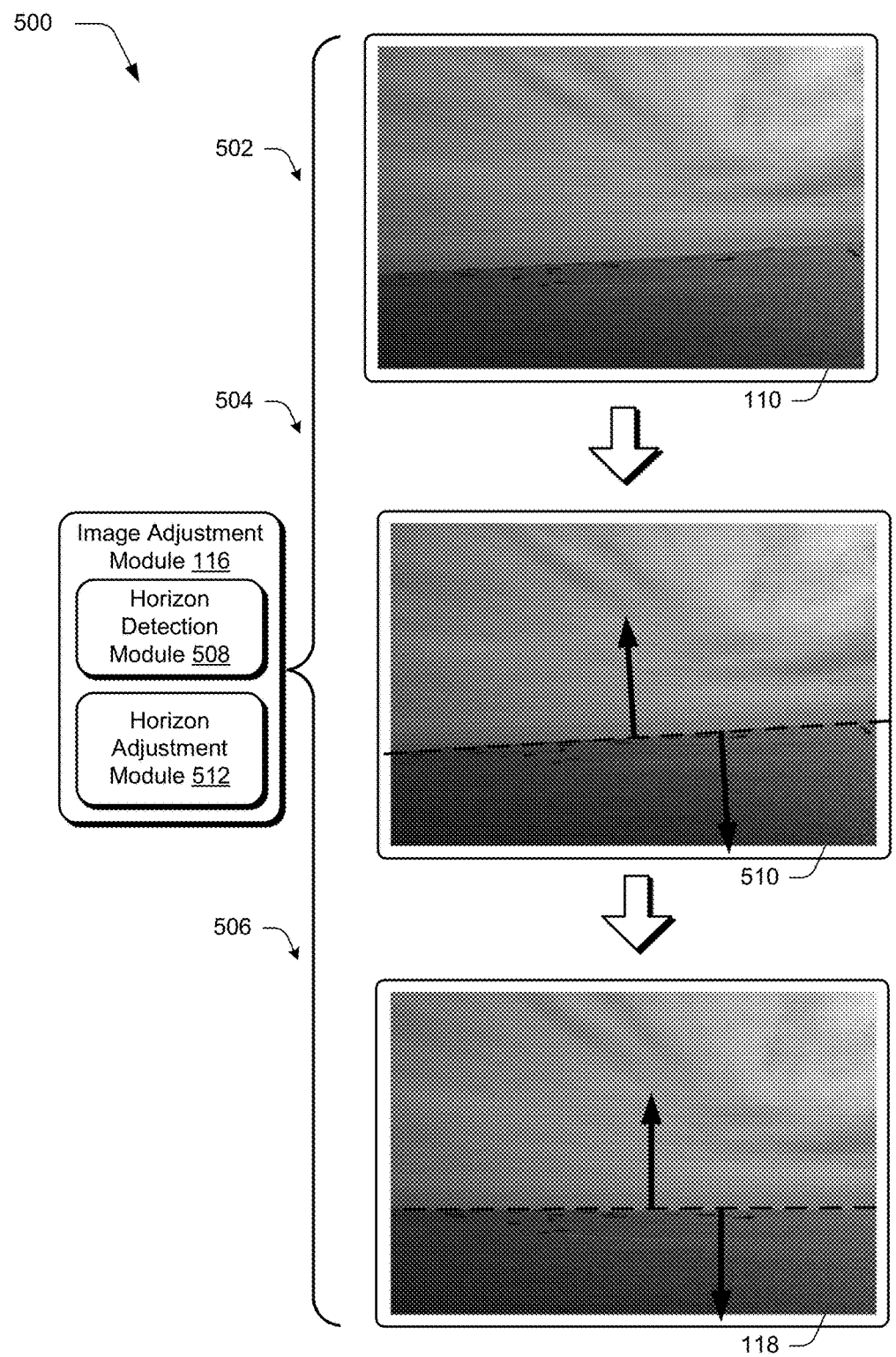
FIG. 5 depicts a system showing the image classification module of FIG. 2 in greater detail as employing criteria to determine suitability for an associated image adjustment technique that involves a horizon.

FIG. 5 depicts a system 500 showing the image classification module of FIG. 2 in greater detail as employing criteria to determine suitability for an associated image adjustment technique that involves a horizon. This system is 500 shown using first, second, and third stages 502, 504, 506. At the first stage 502, image data 110 is shown that is captured using one or more image sensors 106 of an image capture device 104. The image data 110 is captured of an image scene that includes the sea and sky with a few boats.

At the second stage 504, the image data 110 is processed by a horizon detection module 508. The horizon detection module 508 is representative of functionality to detect whether a horizon is identifiable in the image data 110. For example, the horizon detection module 508 may also include functionality to detect a line as well as a total length of line segments that lie along that line, which is illustrated in FIG. 5 through use of a phantom line that follows a separation of the sky and sea.

Differences in portions on either side of the line may also be identified. This may include measuring a difference in color, gradient, and so on between two regions of the image data 110 that are divided by the line. This may be performed for each line segment that is identifiable in the image data 110 to determine which of the line segments, if any, are likely to correspond to the horizon.

At the third stage 506, a horizon adjustment module 512 is employed to adjust the image data 110 to generate the adjusted image data 118 that is consistent with human perception expectations. In this example, the image data 110 is adjusted such that the detected horizon runs horizontal between the edges of the image data 110. Thus, in this example, the image data 110 was classified as suitable for horizon adjustment based techniques, which were then employed to adjust the image data 110. Other image adjustment techniques may also employ these features without departing from the spirit and scope thereof. Further, as previously described in relation to FIG. 2 instances may be encountered in which the image data 110 is not suitable for the image adjustment techniques. Accordingly, in such an instance the adjustment of the image data 110 may be skipped to leave the image data 110 "as is." Further discussion of these and other techniques may be found in relation to the following procedures.

Example Procedures

The following discussion describes image classification techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
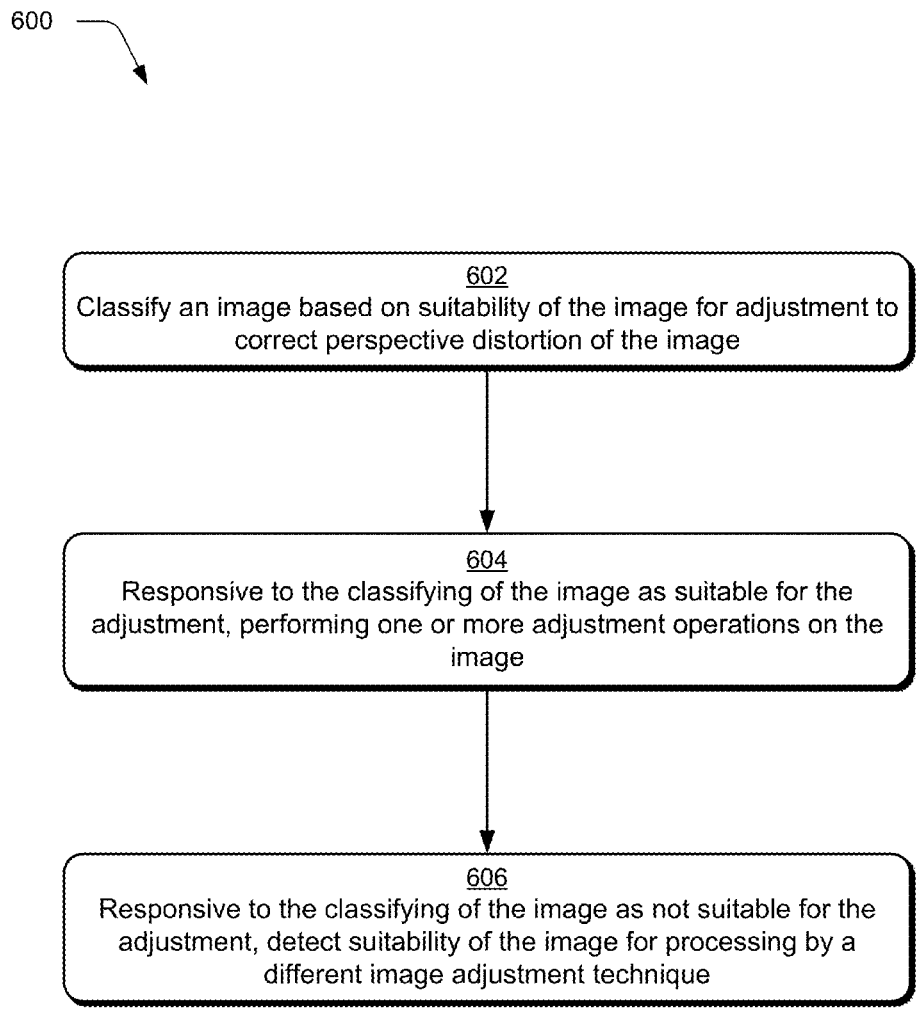
FIG. 6 is a flow diagram depicting a procedure in an example implementation in which an image is classified based on suitability for adjustment to correct perspective distortion of the image.

FIG. 6 depicts a procedure 600 in an example implementation in which an image is classified based on suitability for adjustment to correct perspective distortion of the image. An image is classified based on suitability of the image for adjustment to correct perspective distortion of the image (block 602). The image, for instance, may be classified for suitability for upright adjustment, horizon adjustment, and so on.

Responsive to the classification of the image as suitable for the adjustment, one or more adjustment operations are performed on the image (block 604). Continuing with the previous example, an associated operation that corresponds to the classification may be performed based on a classification of the image as suitable for that operation.

Responsive to the classification of the image as not suitable for the adjustment, suitability is detected of the image for processing by a different image adjustment technique (block 606). In this instance, the image data is not suitable for the associated operation. Accordingly, suitability of a different operation may be explored, an example of which is described as follows and shown in the corresponding figure.

Figure 7:
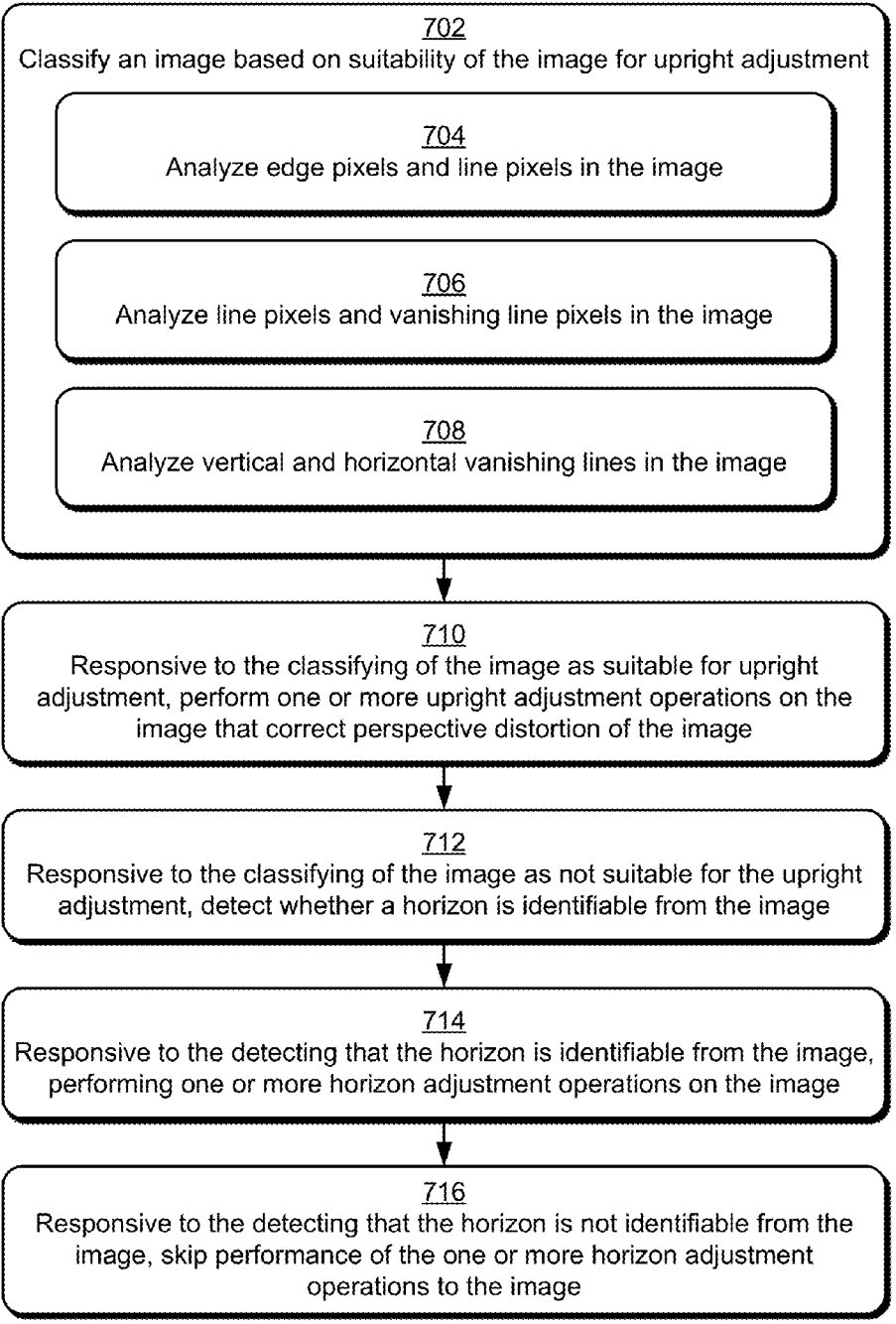
FIG. 7 is a flow diagram depicting a procedure in an example implementation in which an image is classified based on suitability for upright adjustment and/or horizon adjustment to correct perspective distortion of the image.

FIG. 7 depicts a procedure 700 in an example implementation in which an image is classified based on suitability for upright adjustment and/or horizon adjustment to correct perspective distortion of the image. An image is classified based on suitability for upright adjustment (block 702). This may be performed in a variety of ways, such as through analysis of edge pixels and line pixels in the image (block 704), analysis of line pixels and vanishing line pixels in the image (block 706), vertical and horizontal vanishing lines in the image (block 708), and so on.

Responsive to the classification of the image as suitable for upright adjustment, one or more upright adjustment operations are performed on the image that correct perspective distortion of the image (block 710). The upright adjustment module 204, for instance, may then be employed to perform the adjustment techniques after a determination that these techniques have a likelihood of operating as intended.

Responsive to the classification of the image as not suitable for upright adjustment, it is detected whether a horizon is identifiable from the image (block 712). If so, one or more horizon adjustment operations are performed on the image (block 714). If no, performance of the one or more horizon adjustment operations on the image is skipped (block 716). A variety of other examples are also contemplated, such as to employ these classification techniques to determine suitability of a variety of other image adjustment techniques as previously described.

Example System and Device

Figure 8:
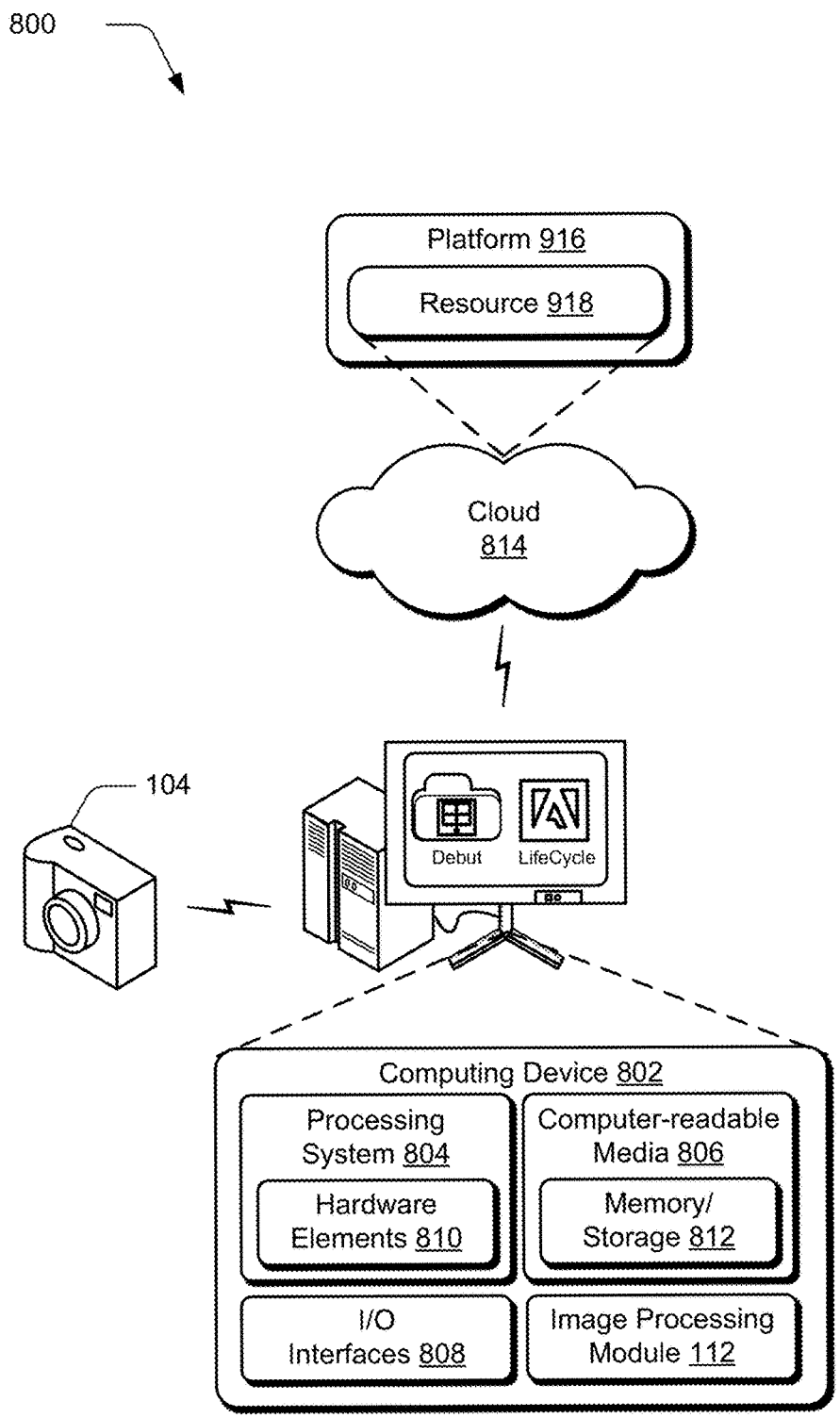
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the image processing module 112, which may be configured to process image data, such as image data captured by an image capture device 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for digital image classification and adjustment, a computing device comprising:
   a processing system;
   one or more computer-readable storage media having instructions stored thereon that, responsive to execution by the processing system, causes the processing system to implement functionality including:
      an image processor that identifies characteristics of a digital image including detecting whether a horizon is identifiable;
      an image classifier that:
         determines, without performing an upright adjustment technique, that the upright adjustment technique is not suitable to correct perspective distortion of the digital image based on the identified characteristics; and
         responsive to the determination that the upright adjustment technique is not suitable to correct perspective distortion of the digital image, determines without performing a horizon adjustment technique that the horizon adjustment technique is suitable to correct perspective distortion of the digital image based on detecting that the horizon is identifiable; and
      an image adjuster that, responsive to the determination by the image classifier that the horizon adjustment technique is suitable to correct perspective distortion of the digital image, performs the horizon adjustment technique on the digital image to generate an adjusted image.

2. The computing device of claim 1, the image classifier further configured to, without performing another image adjustment technique, determine whether the another image adjustment technique is suitable to correct perspective distortion of the digital image, and wherein the image adjuster is further configured to perform the another image adjustment technique on the digital image.

3. The computing device of claim 1, wherein the characteristics include one or more of edge pixels, line pixels, or vanishing line pixels.

4. The computing device of claim 1, wherein the characteristics include edge pixels and line pixels, and wherein the determining that the upright adjustment technique is not suitable to correct perspective distortion of the digital image is based on an analysis of the edge pixels and the line pixels.

5. The computing device of claim 4, wherein the analysis is based on a ratio between a number of the edge pixels and a number of the line pixels that indicative of how many edges in the digital image are straight lines.

6. The computing device of claim 4, wherein the analysis is based on a ratio between a number of the edge pixels and a number of the line pixels that is indicative of how many objects in the digital image are man-made structures.

7. The computing device of claim 1, wherein the characteristics include line segments and vanishing line segments, and wherein the determining that the upright adjustment technique is not suitable to correct perspective distortion of the digital image is based on an analysis of the line segments and the vanishing line segments.

8. The computing device of claim 7, wherein the analysis includes determining Manhattan directions based on the vanishing line segments, and further includes determining at least one of the line segments as corresponding to the Manhattan directions.

9. The computing device of claim 7, wherein the analysis is based on a ratio between a number of the line segments and a number of the vanishing line segments that is indicative of how many objects in the digital image are man-made structures.

10. The computing device of claim 7, wherein the analysis is based on an average length of the vanishing line segments that is indicative of how many objects in the digital image are man-made structures.

11. The computing device of claim 7, wherein the analysis includes determining a total length of line segments that lie along a particular vanishing line.

12. In a digital medium environment for digital image classification and adjustment, at least one computer-readable medium storing processor-executable instructions that, responsive to execution by a processing system, cause the processing system to perform operations comprising:
   identifying characteristics of a digital image including detecting whether a horizon is identifiable;
   determining, without performing a horizon adjustment technique, that the horizon adjustment technique is not suitable to correct perspective distortion of the digital image based on detecting that the horizon is not identifiable;
   responsive to the determining that the horizon adjustment technique is not suitable to correct perspective distortion of the digital image, determining, without performing an upright adjustment technique, that the upright adjustment technique is suitable to correct perspective distortion of the digital image based on the identified characteristics;
   responsive to the determining that the upright adjustment technique is suitable to correct perspective distortion of the digital image, generating an adjusted image by performing the upright adjustment technique on the digital image.

13. The at least one computer-readable medium of claim 12, wherein the characteristics include one or more of edge pixels, line pixels, or vanishing line pixels.

14. At least one computing device in a digital medium environment for digital image classification and adjustment, the at least one computing device including a processing system and at least one computer-readable storage medium, the at least one computing device comprising:
  means for identifying characteristics of a digital image including detecting whether a horizon is identifiable;
  means for determining, without performing an upright adjustment technique, that the upright adjustment technique is not suitable to correct perspective distortion of the digital image based on the identified characteristics;
  means for determining, responsive to the determining that the upright adjustment technique is not suitable to correct perspective distortion of the digital image and without performing a horizon adjustment technique, that the horizon adjustment technique is suitable to correct perspective distortion of the digital image based on detecting the horizon is identifiable;
  means for generating, responsive to the determining that the horizon adjustment technique is suitable to correct perspective distortion of the digital image, an adjusted image by performing the horizon adjustment technique on the digital image.

15. The at least one computer-readable medium of claim 12, wherein the characteristics include edge pixels and line pixels, and wherein the determining that the upright adjustment technique is suitable to correct perspective distortion of the digital image is based on an analysis of the edge pixels and the line pixels.

16. The at least one computer-readable medium of claim 15, wherein the analysis is based on a ratio between a number of the edge pixels and a number of the line pixels that indicative of how many edges in the digital image are straight lines.

17. The at least one computer-readable medium of claim 15, wherein the analysis is based on a ratio between a number of the edge pixels and a number of the line pixels that is indicative of how many objects in the digital image are man-made structures.

18. The at least one computer-readable medium of claim 15, the operations further comprising: without performing another image adjustment technique, determining whether the another image adjustment technique is suitable to correct perspective distortion of the digital image, and the generating further includes performing the another image adjustment technique on the digital image.

19. The at least one computer-readable medium of claim 15, wherein the characteristics include one or more of edge pixels, line pixels, or vanishing line pixels.

20. In a digital medium environment for digital image classification and adjustment, a method comprising:
  identifying characteristics of a digital image including detecting whether a horizon is identifiable;
  determining, without performing an upright adjustment technique, that the upright adjustment technique is not suitable to correct perspective distortion of the digital image based on the identified characteristics;
  determining, responsive to the determination that the upright adjustment technique is not suitable to correct perspective distortion of the digital image and without performing a horizon adjustment technique, that the horizon adjustment technique is suitable to correct perspective distortion of the digital image based on detecting that the horizon is identifiable; and
  performing, responsive to the determination by the image classifier that the horizon adjustment technique is suitable to correct perspective distortion of the digital image, the horizon adjustment technique on the digital image to generate an adjusted image.

21. The method of claim 20, further comprising: without performing another image adjustment technique, determining whether the another image adjustment technique is suitable to correct perspective distortion of the digital image, and performing the another image adjustment technique on the digital image.

22. The method of claim 20, wherein the characteristics include edge pixels and line pixels, and wherein the determining that the upright adjustment technique is not suitable to correct perspective distortion of the digital image is based on an analysis of the edge pixels and the line pixels.

23. The method of claim 20, wherein the characteristics include line segments and vanishing line segments, and wherein the determining that the upright adjustment technique is not suitable to correct perspective distortion of the digital image is based on an analysis of the line segments and the vanishing line segments.

* * * * *